United States Patent [19]

Hoover et al.

[11] 4,049,864

[45] Sept. 20, 1977

[54] PENETRATION RESISTANT BARRIER

[75] Inventors: William R. Hoover; Keith E. Mead; Henry K. Street, all of Albuquerque, N. Mex.

[73] Assignee: The United States of America as represented by the United States Energy Research and Development Administration, Washington, D.C.

[21] Appl. No.: 657,518

[22] Filed: Feb. 12, 1976

[51] Int. Cl.² .................. B32B 9/04; B32B 15/04
[52] U.S. Cl. ........................... 428/332; 109/80; 109/82; 428/417; 428/447; 428/450; 428/911
[58] Field of Search ............... 428/911, 48, 429, 450, 428/465, 332, 447, 920, 921; 109/80, 82, 78, 84, 85; 89/36; 106/43, 55

[56] References Cited

U.S. PATENT DOCUMENTS

| | | | |
|---|---|---|---|
| 2,279,110 | 4/1942 | Collins | 89/36 |
| 2,381,779 | 8/1945 | Scott | 109/80 |
| 3,220,878 | 11/1965 | Pines | 428/413 |
| 3,408,966 | 11/1968 | Gartner | 109/80 |

*Primary Examiner*—George F. Lesmes
*Assistant Examiner*—P. J. Thibodeau
*Attorney, Agent, or Firm*—Dean E. Carlson; Dudley W. King; Robert W. Weig

[57] ABSTRACT

The disclosure relates to a barrier for resisting penetration by such as hand tools and oxy-acetylene cutting torches. The barrier comprises a layer of firebrick, which is preferably epoxy impregnated sandwiched between inner and outer layers of steel. Between the firebrick and steel are layers of resilient rubber-like filler.

3 Claims, 1 Drawing Figure

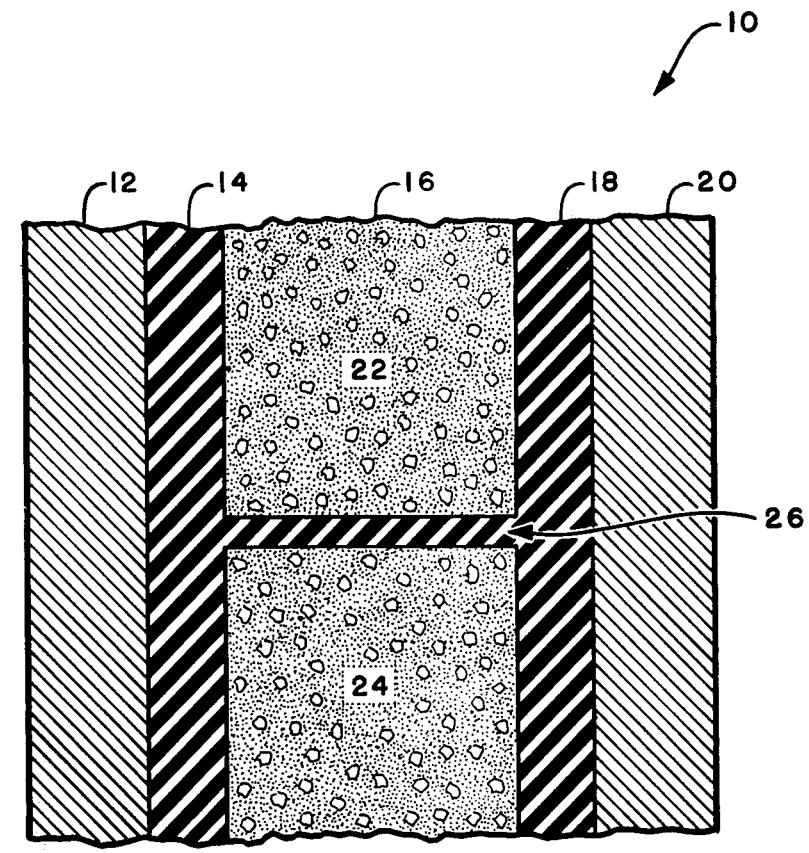

PENETRATION RESISTANT BARRIER

FIELD OF THE INVENTION

The invention relates to a barrier for safes, vaults and the like and in particular to a barrier resistant to penetration by hand tools and cutting torches.

BACKGROUND OF THE INVENTION

Most vaults, safes and the like can be entered by a skilled person using hand tools such as chain saws, cutting wheels and oxy-acetylene torches. Because total denial of entry with such tools is precluded at the present time, it is desirable to at least effectively prolong penetration time so that individuals attempting penetration of the device will likely be discovered by other security devices or security personnel.

A problem with prior art penetration resistant barriers is that they are frequently expensive; the more resistant to penetration, the more expensive.

One object of the present invention is to inexpensively provide penetration resistance for safes, vaults and the like.

Another object of the present invention is to provide heat resistance between inner and outer barrier walls.

Yet another object of the invention is to provide a preferably torch resistant resilient support for heat resistant material between inner and outer barrier walls so that hand tool penetration of the fire resistant material is relatively slow.

One advantage in practicing the instant invention is that in accordance therewith, the penetration time of barriers using a cutting torch and hand tools is increased.

Another advantage of the present invention is that a penetration resistant safe or vault constructed with barriers in accordance therewith is relatively economical.

SUMMARY OF THE INVENTION

In accordance with the present invention there is provided a barrier for resisting penetration by cutting torch and hand tools. As shown, the barrier comprises a first layer of steel, a first layer of resilient rubber-like filler, a layer of ceramic firebrick, a second layer of resilient rubber-like filler and a second layer of steel. In a preferred embodiment the layers of steel comprise mild steel, the ceramic firebrick is epoxy impregnated and the rubber-like filler comprises a silicone rubber material.

BRIEF DESCRIPTION OF THE DRAWING

Other objects and advantages of the present invention will be apparent to those skilled in the art from the following description with reference to the appended drawing wherein:

The FIGURE illustrates a cross sectional view of a barrier in accordance with the present invention.

DETAILED DESCRIPTION OF A PREFERRED EMBODIMENT OF THE INVENTION

As illustrated in the Figure, a barrier 10 comprises a first layer of steel 12, a first layer of resilient rubber-like filler 14, a layer of ceramic firebrick 16, a second layer of resilient rubber-like filler 18, and a second layer of steel 20. Either layer of steel may be on the outside of a vault or safe because the barrier may be symmetrical about firebrick 16. Layers of steel 12 and 20 may comprise mild steel over any thickness range. However, for most applications, the steel will be from about 50 mils to about 1 inch thick. In a selected preferred embodiment the steel panels 12 and 20 were about 0.25 inch thick. The inner layer 16 of firebrick may be any desired thickness but in most applications will be up to about 1 foot thick. In the selected preferred embodiment it was about 0.750 inch thick. The filler material in layers 14 and 18 may be any selected thickness, but will usually range in thickness from about ⅛ inch to about ¼ inch thick. In the selected preferred embodiment it was about 0.125 inch thick. It will be appreciated that some of the same filler material as is in layers 14 and 16 is preferably disposed between individual firebricks 22 and 24 in a layer 26.

The resilient material in layers 14, 16 and 26 provides a resilient shock absorbing bed for the firebrick when it is attacked by hand tools such as a hammer and chisel. It has been found that without such resiliency the firebrick is penetrated far more rapidly.

To increase the hardness of the firebrick and its resistance to hammer and chisel, it is preferably impregnated with any suitable commercially available thermosetting highly cross-linked polymer, such as an epoxy resin, which may incorporate a hardener. One example is the Shell Company's Epon 828 with a Z hardener and butadiene acrylonitrile modifier (CTBN). This epoxy and modifier combination greatly increases the hammer and chisel toughness of firebrick and is also highly resistant to oxy-acetylene cutting torch heat. Impregnations such as polyurethane will flow from heated firebricks and thereby fail.

A satisfactory commercially available ceramic firebrick is A. P. Green's, Greenlite-30 which is a 3000° F firebrick. An easily available and usable steel is "mild" steel. The rubber-like filler may be commercially available Room Temperature Vulcanizing silicone rubber. Silicone rubber filler is particularly effective as a cushion backing for the firebricks, making the hammer and chisel attack on the firebrick very difficult. In addition, the ablative nature of the silicone rubber has decreased cutting rates with a torch through the steel to about 0.5 inches per minute. A thin protective layer of ash forms on the silicone rubber when it is heated with a torch. This ash must be removed before further penetration of the rubber with a torch is achievable. During one test, it was found that so much heat was required that one torch overheated and was made inoperative and an entire 80 cubic feet oxygen tank was consumed making one 12 inch cut. The silicone rubber was also found to be very resistant to both a water cooled diamond cut-off wheel and a standard abrasive wheel.

The recitations herein of specific materials in a selected preferred embodiment are merely to exemplify the invention and it will be appreciated by those skilled in the art that other firebricks and epoxies as well as other rubber-like resilient filler materials and metal inner and outer layers will accomplish the desideratum of the invention, i.e., prolong cutting torch and hand tool penetration time of a barrier.

The various features and advantages of the invention are thought to be clear from the foregoing description. However, various other features and advantages not specifically enumerated will undoubtedly occur to those versed in the art, as likewise will many variations and modifications of the embodiments illustrated herein, all of which may be achieved without departing from the spirit and scope of the invention as defined by the appended claims.

What we claim is:

1. A barrier for resisting penetration by cutting torch and hand tools comprising:
   an outer plate of mild steel from about 50 mils to about 1 inch thick;
   a first layer of silicone rubber from about ⅛ inch to about ½ inch thick;
   a layer of epoxy resin impregnated ceramic firebrick up to about 1 foot thick;
   a second layer of silicone rubber from about ⅛ inch to about ½ inch thick, said first and second layers of silicone rubber sandwiching said ceramic firebrick layer between them; and
   an inner plate of mild steel from about 50 mils to about 1 inch thick, said inner and outer plates of steel sandwiching between them said first mentioned sandwiched firebrick and silicone rubber layers.

2. The invention of claim 1 wherein said epoxy resin impregnated firebrick comprises 3000° F firebrick impregnated with epoxy resin and butadiene acrylonitrile modifier.

3. The invention of claim 1 wherein said firebricks are separated from one another by strata of silicone rubber.

* * * * *